(12) United States Patent
Chandra et al.

(10) Patent No.: US 7,474,887 B2
(45) Date of Patent: Jan. 6, 2009

(54) METHOD AND SYSTEM FOR REDUCING BATTERY CONSUMPTION IN WIRELESS TRANSMIT/RECEIVE UNITS (WTRUS) EMPLOYED IN A WIRELESS LOCAL AREA NETWORK/WIRELESS WIDE AREA NETWORK (WLAN/WWAN)

(75) Inventors: Arty Chandra, Manhasset Hills, NY (US); Eldad Zeira, Huntington, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 10 days.

(21) Appl. No.: 11/054,811

(22) Filed: Feb. 10, 2005

(65) Prior Publication Data
US 2005/0190710 A1 Sep. 1, 2005

Related U.S. Application Data

(60) Provisional application No. 60/543,462, filed on Feb. 10, 2004, provisional application No. 60/646,793, filed on Jan. 25, 2005.

(51) Int. Cl.
  H04B 1/16 (2006.01)
  H04B 1/38 (2006.01)
  G08C 17/00 (2006.01)
  H04Q 1/30 (2006.01)
(52) U.S. Cl. ............. 455/343.2; 455/574; 370/311; 340/7.3; 340/7.36

(58) Field of Classification Search ........... 455/571, 455/343.2, 343.3; 370/311, 412, 417, 7.28, 370/7.3, 7.36, 7.38, 7.34; 340/7.28, 7.3, 340/7.36, 7.38, 7.34
See application file for complete search history.

(56) References Cited

U.S. PATENT DOCUMENTS

| | | | |
|---|---|---|---|
| 5,875,186 A * | 2/1999 | Belanger et al. | ........... 370/331 |
| 6,236,674 B1 | 5/2001 | Morelli et al. | |
| 6,377,790 B1 | 4/2002 | Ishii | |
| 6,463,307 B1 * | 10/2002 | Larsson et al. | ........... 455/574 |
| 6,477,382 B1 | 11/2002 | Mansfield et al. | |

(Continued)

OTHER PUBLICATIONS

IEEE P802.11 Wireless LANs, TGn Sync Proposal Technical Specification, Document IEEE 802.11-04/0889r3, Jan. 2005, pp. 1-164.

(Continued)

Primary Examiner—Vincent P Harper
Assistant Examiner—Marivelisse Santiago
(74) Attorney, Agent, or Firm—Volpe and Koenig, P.C.

(57) ABSTRACT

Method and system for reducing battery consumption during an active session wherein an access point (AP) transmits a wireless transmit/receive unit (WTRU) a packet information regarding packets in a queue waiting for transmission to the WTRU and when the packets are to be decoded, whereby enabling the WTRU to enter or remain in an OFF mode in accordance with the packet information. The AP does not send the packets to the WTRU until the AP informs the WTRU about the packet.

26 Claims, 1 Drawing Sheet

U.S. PATENT DOCUMENTS

| | | | |
|---|---|---|---|
| 6,501,961 | B1 | 12/2002 | Kirkpatrick |
| 6,633,187 | B1 | 10/2003 | May et al. |
| 6,691,215 | B1 | 2/2004 | Mirov et al. |
| 6,707,867 | B2 * | 3/2004 | Diepstraten et al. ......... 375/354 |
| 6,748,546 | B1 | 6/2004 | Mirov et al. |
| 6,765,882 | B2 * | 7/2004 | Rittle et al. ................. 370/277 |
| 6,804,542 | B1 | 10/2004 | Haartsen |
| 6,807,227 | B2 | 10/2004 | Chien |
| 7,181,190 | B2 * | 2/2007 | Abhishek et al. ......... 455/343.4 |
| 2002/0068527 | A1 * | 6/2002 | Massingill et al. ......... 455/13.4 |
| 2004/0264396 | A1 | 12/2004 | Ginzburg et al. |
| 2005/0002346 | A1 * | 1/2005 | Bichot ........................ 370/312 |

OTHER PUBLICATIONS

TGn Sync Complete Proposal, Document IEEE 802.11-04/888r8, Jan. 2005, pp. 1-111.

IEEE Wireless LAN Edition, A Compilation Based On IEEE Std. 802.11™-1999 (R2003) and its amendments, pp. 1-678 Sep. 2003.

IEEE P802.11 Wireless LANs, TGn Sync TGn Proposal MAC Simulation Methodology, Jan. 2005, pp. 1-27.

* cited by examiner

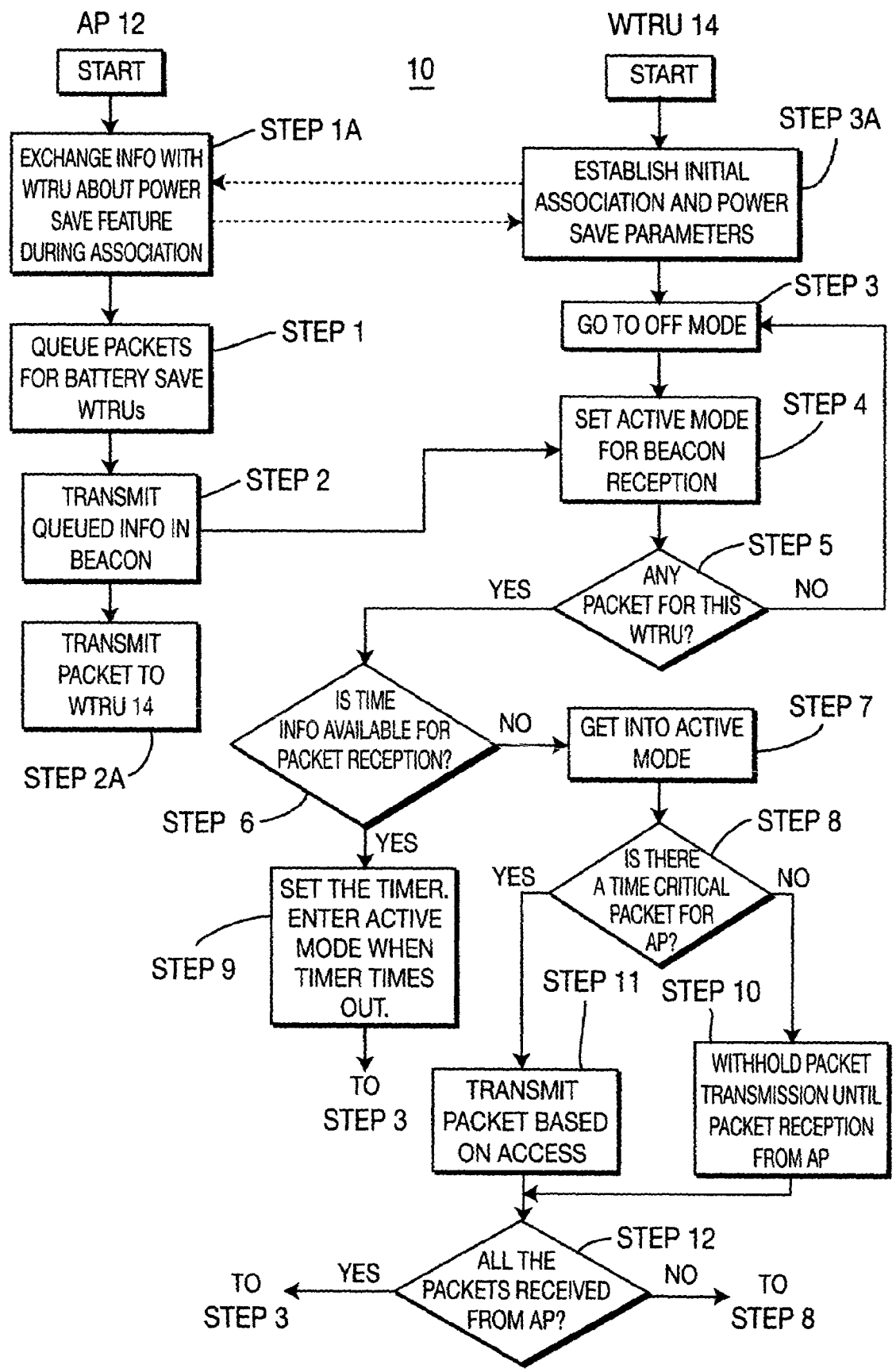

METHOD AND SYSTEM FOR REDUCING BATTERY CONSUMPTION IN WIRELESS TRANSMIT/RECEIVE UNITS (WTRUS) EMPLOYED IN A WIRELESS LOCAL AREA NETWORK/WIRELESS WIDE AREA NETWORK (WLAN/WWAN)

CROSS REFERENCE TO RELATED APPLICATION

This application claims the benefit of U.S. Provisional Application 60/543,462 filed Feb. 10, 2004, and U.S. Provisional Application 60/646,793 filed Jan. 25, 2005, both of which are incorporated by reference as if fully set forth.

FIELD OF INVENTION

The present invention relates to WWANs/WLANs and more particularly to a method and apparatus for reducing the battery consumption of WTRUs in a WLAN/WWAN network.

BACKGROUND

WLAN networks currently in use typically provide for an access point (AP) to send information about queued packets for WTRUs when WTRUs are in sleep state. WTRUs enter into a sleep state by sending a message to the AP and receiving a confirmation from the AP. This is performed at a much lower frequency for WTRUs that are not in an active session for a longer period of time.

However, there are no techniques or apparatus presently in use in WTRUs to reduce battery consumption during an active session for every application independent of the nature of application.

SUMMARY

The present invention is characterized by a "power save" feature for WTRUs. This "power save" feature can be used by all or some WTRUs in the system. A WTRU can inform an AP about its "power save" feature either during association or any time after the association. The AP sends packets to "power save" enabled WTRUs after indicating this information to the WTRU. This method is employed by the WTRU for reducing battery consumption during an active session. The AP transmits the WTRU information regarding packets in a queue for that WTRU, (optionally when the packets are to be decoded), thereby enabling the WTRUs to enter or remain in the OFF mode until the next transmission of the packet information, (if there are no packets for the WTRU), or the intended arrival time. The OFF mode is defined as the mode in which a WTRU listens to a beacon and remains in AWAKE mode between two beacons if there are queued packets for the WTRU, but goes into sleep state if there are no queued packets indicated in the beacon for the WTRU until the next Beacon. The WTRU enters OFF mode from AWAKE mode by default after every beacon if the beacon indicates no queued packet for the WTRU.

BRIEF DESCRIPTION OF THE DRAWINGS

The present invention will be understood from a consideration of the accompanying drawings, wherein like elements are designated by like numerals and, wherein:

FIG. 1 is a flow diagram of process of communication between an AP and a WTRU operating in a WLAN network and embodying the principles of the present invention.

DETAILED DESCRIPTION OF THE PREFERRED EMBODIMENTS

Although the features and elements of the present invention are described in the preferred embodiments in particular combinations, each feature or element can be used alone without the other features and elements of the preferred embodiments or in various combinations with or without other features and elements of the present invention.

FIG. 1 shows a method 10 implemented by WLAN network comprising an AP 12 such as a multiport wireless AP and a WTRU 14 capable of communicating with the AP 12.

Hereafter, the terminology "WTRU" includes but is not limited to a user equipment, mobile station, fixed or mobile subscriber unit, pager, or any other type of device capable of operating in a wireless environment which may, for example, be a personal computer (PC) or a laptop provided with a WLAN (or WWAN) card to enable wireless transmission between the PC or laptop and the AP 12 or any other similarly equipped device. When referred to hereafter, the terminology "AP" includes but is not limited to a base station, Node-B, site controller, access point or any other type of interfacing device in a wireless environment. Although only one WTRU 14 is shown in FIG. 1, it should be understood that a greater number of WTRUs may communicate with the AP 12 utilizing the method and apparatus described herein with equal success, a single WTRU being shown merely for purposes of simplicity. Also, the example given shows a WLAN. It should be understood that the present invention may be employed with equal success in a WWAN.

The WTRU 14 is configured to have an AWAKE state, a DOZE mode and an OFF mode in accordance with the present invention. The AWAKE and DOZE state are part of the current WLAN standard. The present invention introduces a new state called OFF mode.

In the AWAKE state, the WTRU 14 is fully powered for normal operation with the AP 12 and is able to receive and transmit packets at anytime.

In the OFF mode, the WTRU 14 listens to certain packet, preferably beacon, and enters the AWAKE mode between two beacons if there are queued packets for the WTRU 14. However, the WTRU 14 automatically enters into OFF mode until the next beacon if there are no queued packets indicated in the beacon for that WTRU 14. Unlike the DOZE mode, the WTRU 14 enters the OFF mode from the AWAKE mode by default after every beacon if the beacon indicates no queued packet for that WTRU 14.

Referring to FIG. 1, a method 10 for reducing battery consumption in accordance with the present invention is explained. An AP 12, at step S1, (step S1A is omitted from this description and is described below), creates a queue of packets to be transmitted for "power save" WTRUs. The AP 12 withholds transmission of any packets to a WTRU 14 if the previous beacon indicated zero queued packets for the WTRU 14. The AP 12 only sends packets to the WTRU 14 after informing the WTRU 14 about the queued packet in the beacon. The present invention will be mainly explained with reference to a beacon just for simplicity. However, it should be noted that any packet, signal or plurality of packets, may be utilized instead of a beacon which will be explained hereinafter.

In order to enable the WTRU 14 to save battery energy, the AP 12, at step S2, transmits information about the packets in the queue to the WTRU 14, preferably but not necessarily, in a beacon packet. The information identifies the location, the number of packets and the destination of packets in the queue. Signaling other than a beacon can be used to send the information about packets in the queue. The signals from the AP 12 sending queue information may be special packets designed for signaling the queue information. The queue signaling may be a part of another packet or packet header. Any such packet may be periodic so that the WTRU 14 can get into the AWAKE state to receive this packet. Alternatively, the packet may be transmitted non-periodically, whereby a previous packet that contained the queued packet information at the AP for the WTRU 14 informs the WTRU 14 about the next time the packet information will be sent from the AP12.

The AP 12 may communicate information other than the identity of packets in the queue. For example, the AP 12 may send information identifying those WTRUs that should remain in the active state when the AP 12 knows it will be sending packets to such WTRUs within the superframe which occurs between two (2) successive beacons. The information communicated to such WTRUs may further include those WTRUs for whom packets are queued at the AP 12, those WTRUs to which the AP 12 is planning to send packets during a superframe occurring at a time between two (2) beacons, queued traffic information including traffic type, time, (i.e., "place"), in the queue and the number of queued packets, when the packet will be sent to the WTRU, medium access (MAC) delay, AP load, or the like.

After the WTRU 14 is powered on, the WTRU 14 establishes an initial association with the AP 12 (step S3A). During this process for establishing initial association, the WTRU 14 may inform the AP 12 that the WTRU 14 will implement a "power save" mechanism so that the WTRU 14 may enter a OFF mode in accordance with the packet information transmitted from the AP 12. In response, the AP 12 may send parameters necessary for implementing the battery saving mechanism such as the number of beacons with the sleep period, which may be zero (0) as a default or any other integer value and the packet type that will be used for sending queued packet information which may be the beacon by default. Alternatively, the WTRU 14 may decide to implement the battery saving mechanism after the initial association is established. For example, the WTRU 14 may initiate the battery saving mechanism after the remaining battery life (BL) falls below a predetermined threshold. The battery saving mechanism may be implemented automatically as a default.

The WTRU 14, having established an association with the AP 12, monitors the beacon at step S4 and determines if the beacon contains any queue information for the WTRU 14, at step S5. If there is no packet for the WTRU 14, the method 10 returns to step S3. If the beacon contains packet information for the WTRU 14, the method 10 advances to step S6 to decode the timing information of the packet reception. If there is no packet timing information for the WTRU 14, the WTRU 14 enters the active mode to receive the packet (step S7). If there is packet timing information for the WTRU 14, the WTRU 14 sets a timer and enters the active mode when the timer times out to receive the packet (step S9). The WTRU may stay in the AWAKE mode to receive all the packets from the AP, or may stay in the AWAKE mode only during the time interval indicated that data is transmitted to the WTRU in the packet information.

Referring back to step S7, after the WTRU 14 enters into the active mode, the WTRU 14 determines whether there are any packets to be transmitted to the AP 12 from the WTRU 14 (step S8). In the event that there are any packets to be transmitted at the WTRU 14, the queue is examined to determine if the packets are time critical (step S8). If the packets are not time-critical, the WTRU 14 withholds sending of any packets to the AP 12 to avoid collision until the WTRU 14 receives the packet, (or packets), intended for the WTRU 14 from the AP 12 (step S10). If the packets at the WTRU 14 are time-critical, the WTRU 14 transmits the packet whenever possible (step S11). The WTRU 14 then determines whether all the packets are received from the AP 12 (step S12). If all the packets are received, the method 10 returns to step S3 and the WTRU enters into OFF mode. If all the packets are not yet received, the method 10 returns to step S8.

In order to save additional battery life, the WTRU 14 may examine, periodically or non-periodically, remaining BL and coordinate with the AP 12 to use "power save" feature. If the remaining BL is less than a threshold, the WTRU 14 notifies the AP 12 of its "power save" feature and requests an acknowledgement (ACK) and necessary parameters, (such as frequency of listening to the beacon and the packet type that will be used for sending queued packet information), from the AP 12.

The AP 12 may withhold informing about the queued packet at the AP in accordance with allowed buffer at the AP 12 for each application or WTRU and quality of service (QoS) requirements of the packets, such as latency. This ensures buffering multiple packets for the WTRU 14 at the AP 12 and making the WTRU 14 enter AWAKE mode less frequently.

In an alternative embodiment, the AP 12, at step S1A, may send information to the WTRU 14 that the WTRU 14 will be polled or sent packets at a given time (t1) after the beacon thereby enabling the WTRU 14 to enter the active state at the designated time. The frequency at which the WTRU 14 is required to be in the active state is dependent upon the AP queue size, latency requirement of the particular application and battery life (and/or battery level) of the WTRU. The AP 12 may alternatively provide the WTRU 14 with an interval, (i.e., "WINDOW"), of time, (for example, a time between t1 and t2 after the beacon), in the event that the AP 12 is not able to ensure a fixed time of transmission.

In a case of scheduled resource allocation, the AP 12 sends packets only at scheduled times and provides the WTRUs with the scheduling information via a beacon or alternatively employing certain special signaling, which may be in the form of new packets designed to transfer such information, or the information can be sent in the packet header.

What is claimed is:

1. A method for conserving power of a wireless transmit/receive unit (WTRU), the method comprising:
    receiving a queue identifying packets that are intended for the WTRU; wherein the queue includes information regarding a location of packets in the queue waiting for transmission to the WTRU in a scheduled transmission;
    entering into an OFF mode when the information included in the queue indicates a delay time above a predetermined threshold, wherein the delay time is based on the location of packets in the queue waiting for transmission;
    entering an AWAKE mode upon expiration of the delay time; and
    receiving the packets at the WTRU.

2. The method of claim 1 further comprising:
    transmitting an indication that the WTRU will enter the OFF mode or AWAKE mode.

3. The method of claim 2 wherein the indication is transmitted during an initial association.

4. The method of claim 2 wherein the indication is transmitted after an initial association.

5. The method of claim 4 wherein the indication is transmitted when a level of battery life falls below a predetermined threshold.

6. The method of claim 1 wherein the queue is received in a beacon frame.

7. The method of claim 1 wherein the queue is received according to predetermined schedule.

8. The method of claim 7 wherein the queue is received periodically.

9. The method of claim 1 wherein the queue is included in a header attached to a packet received by the WTRU.

10. The method of claim 1 wherein the WTRU sets a timer based on the queue and enters an AWAKE mode when the timer expires.

11. The method of claim 10 wherein the WTRU stays in the AWAKE mode to receive all the packets.

12. The method of claim 10 wherein the WTRU enters the OFF mode after receiving the packets identified for receipt by the WTRU.

13. The method of claim 1 wherein the WTRU withholds sending of packets during a time period identified for receiving packets.

14. The method of claim 1, wherein the queue further includes at least one of a number of waiting packets destined for a WTRU, a WTRU identity, a traffic type, and an exact time at which a packet is to be sent to the WTRU.

15. A power efficient wireless transmit/receive unit (WTRU) comprising:
a receiver configured to receive a queue identifying packets that are intended for the WTRU; wherein the queue includes information regarding a location of packets in the queue waiting for transmission to the WTRU in a scheduled transmission; and
a processor configured to place a component of the WTRU into an OFF mode when the information included in the queue indicates a delay time above a predetermined threshold, wherein the delay time is based on the location of packets in the queue waiting for transmission, and to place a component of the WTRU in an AWAKE mode upon expiration of the delay time;
wherein the receiver is further configured to receive the packets when in an AWAKE mode.

16. The WTRU of claim 15, further comprising:
a transmitter configured to transmit an indication that the WTRU will enter the OFF mode or AWAKE mode.

17. The WTRU of claim 16, wherein the indication is transmitted during an initial association.

18. The WTRU of claim 16, wherein the indication is transmitted after an initial association.

19. The WTRU of claim 18, wherein the indication is transmitted when a level of battery life falls below a predetermined threshold.

20. The WTRU of claim 15, wherein the queue is received in a beacon frame.

21. The WTRU of claim 15, wherein the queue is received according to predetermined schedule.

22. The WTRU of claim 21, wherein the queue is received periodically.

23. The WTRU of claim 15, wherein the queue is included in a header attached to a packet received by the WTRU.

24. The WTRU of claim 15, wherein the processor is further configured to place a component of the WTRU in an OFF mode after receiving the packets identified for receipt by the WTRU.

25. The WTRU of claim 15, further comprising:
a transmitter for transmitting packets, wherein the transmitter is configured to withold transmitting of packets during a time period identified for receiving packets.

26. The WTRU of claim 15, wherein the queue further includes at least one of a number of waiting packets destined for a WTRU, a WTRU identity, a traffic type, and an exact time at which a packet is to be sent to the WTRU.

* * * * *